United States Patent [19]

Kato

[11] Patent Number: 5,627,609

[45] Date of Patent: May 6, 1997

[54] TEMPLE FOR EYEGLASS FRAME

[75] Inventor: Niro Kato, Sabae, Japan

[73] Assignee: Kato Kogei Co., Ltd., Sabae, Japan

[21] Appl. No.: 571,249

[22] Filed: Dec. 12, 1995

[30] Foreign Application Priority Data

Dec. 14, 1994 [JP] Japan ................................. 6-310606
Apr. 17, 1995 [JP] Japan ................................. 7-090450

[51] Int. Cl.⁶ ........................................ G02C 5/14
[52] U.S. Cl. ............................ 351/123; 351/111; 351/119
[58] Field of Search .............................. 351/123, 111, 351/113, 118, 119, 121, 41, 158, 51, 52

[56] References Cited

U.S. PATENT DOCUMENTS 4,652,098 3/1987 Anger ........................................ 351/123

OTHER PUBLICATIONS

JIS B7280, 1987 for terms of spectacle frames, Appendix FIG. 7.
Advertisement in a magazine "The Eyes" issued on Aug. 15, 1994.
Sample available under "Megalock" sold in 1990.

*Primary Examiner*—Hung X. Dang
*Attorney, Agent, or Firm*—Larson & Taylor

[57] ABSTRACT

The invention is directed to a temple for an eyeglass frame, the temple including (a) a downwardly inclined temple end portion which is securely supportable behind the ear at the side head of one who wears the eyeglasses, and (b) a ball tip attached to the rear end of the inclined temple end portion by a spring. The inclined temple end portion terminates at substantially the bottom of a concave portion in a curvature of the behind-the-end region and is shaped to substantially fit along a curvature of the behind-the-ear region. The spring extends in the direction of inclination of the inclined temple end portion and is a wire or plate spring having high resilience. The ball tip is in a position wherein it contacts the wearers side head at a rear half region of a concave portion in the curvature of the behind-the-ear region.

2 Claims, 2 Drawing Sheets

TEMPLE FOR EYEGLASS FRAME

BACKGROUND OF THE INVENTION

1. Field of the Invention

The present invention relates to an eyeglass frame uniquely designed so that it is not slipped while worn.

2. Description of the Prior Art

According to the standards in the eyeglass art, eyeglasses should be fitted such that the frame contacts the appropriate portions of a wearer's head and is held there, and the frame should be held in such a manner as if it surrounded the wearer's side head without pressing wearer's blood vessels, nerves and the like or pressing the wearer's head locally.

What is important to maintain an inclined portion of the eyeglass frame temple as above will be described below with reference to FIG. 6 (plan view).

The term "behind-the-ear temporal region" or "behind-the ear region" used herein refers hereinafter to the temporal region behind the wearer's ear on the wearer's side head.

The behind-the-ear temporal region plays an important role in wearing eyeglasses. The majority of people have a behind-the-ear temporal region contoured as schematically shown in FIG. 6. To fit the inclined portion of an eyeglass frame temple onto such a contoured region, it is preferable that the inclined portion contact the region on its entire surface. Also, it is preferable that the inclined portion be firmly pressed onto the fore half region a of the concave portion of the behind-the-ear region, while the inclined portion merely touches the rear half region b. Even if the inclined portion is strongly pressed onto the rear half region b, the eyeglass frame temple is not effectively held against the concave portion comprised of the fore and rear half regions a and b and the eyeglasses can not be prevented from being slipped.

However, the curvature of the behind-the-ear region differs from person to person. Accordingly, it is almost impossible in practice, as noted in the art, to adjust the inclined portion so as to contact the fore half region a on its entire surface.

In the prior art, it has not been achieved yet to simply and accurately fit the inclined portion onto the concave portion of the contoured behind-the-ear region.

Heretofore, the inclined portion of an eyeglass frame temple has been fitted by adjusting the bending angle, bending back the inclined portion (i.e., bending the inclined portion outwardly so as to match the end of an end cover with the curvature of the behind-the-ear region) etc. and then actually wearing the eyeglasses to determine whether the inclined portion is well fitted. However, in almost all cases, the adjusted fitness could not be maintained during hours of use. In fact, usually most wearers begin to complain of the fitness of their eyeglasses within a few days of the adjustment, and in many cases, their eyeglasses are readily slipped due to the improper fitness during the wear.

Further, attempts have been made to prevent the slipping of eyeglasses by, for example, (i) enhancing the bending strength of the inclined portion, (ii) shaping or constructing the inclined portion to engage it behind the wearer's auricle, or (iii) attaching a holding member having substantially the same structure as in (ii) to the eyeglass frame temple. However, these structures cannot hold the inclined portion in such a manner as if the eyeglasses surrounded the wearer's side head, and, what is worse, hold the eyeglasses too firmly onto the wearer's face to keep wearing the glasses for a normal period because of wearer's pain and discomfort resulting from the pressure by the holding member, the end cover and the nose pads against the auricles, nose blood vessels and nerves. Furthermore, these eyeglasses are put on and off with far less ease because of their special shapes or structures of the inclined portions or holding members than the eyeglass frames of the normal type.

SUMMARY OF THE INVENTION

It is an object of the present invention to provide an eyeglass frame which enables simply and accurately fitting an inclined portion in compliance with the contour of the behind-the-ear region of a wearer's side head.

The present invention provides an eyeglass frame which is characterized in that a frame temple has an inclined portion, the inclined portion being securely supportable behind the ear at the side head of one who wears the eyeglasses, being slightly shorter than the standard inclined portions of conventional eyeglass frames, and being shaped to substantially fit along a curvature of the behind-the-ear region, and that a ball tip is attached to the rear end of the frame temple by means of a wire or plate spring having high resilience in a position wherein the ball tip contacts the wearer's side head at a rear half region of a concave portion of the behind-the-ear region.

Further, the present invention provides an eyeglass frame which is characterized in that a frame temple has an inclined portion, the inclined portion being securely supportable behind the ear at the side head of one who wears the eyeglasses, being slightly shorter than the standard inclined portions of conventional eyeglass frames, and being shaped to substantially fit along a curvature of the behind-the-ear region, and that a ball tip is attached to the rear end of the frame temple by means of a plurality of wire or plate springs having high resilience in a position wherein the ball tip contacts the wearer's side head at a rear half region of a concave portion of the behind-the-ear region.

DETAILED DESCRIPTION OF THE PREFERRED EMBODIMENTS

Figure 1:
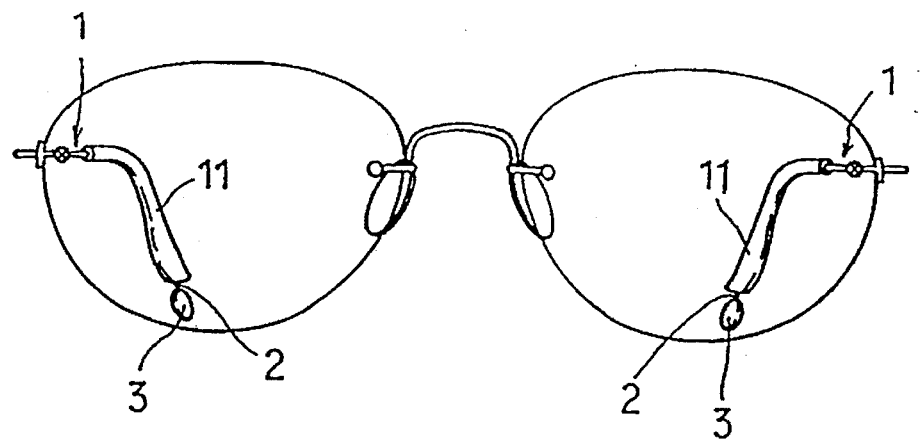
FIG. 1 is a front elevation of an embodiment of the present invention.
Figure 2:
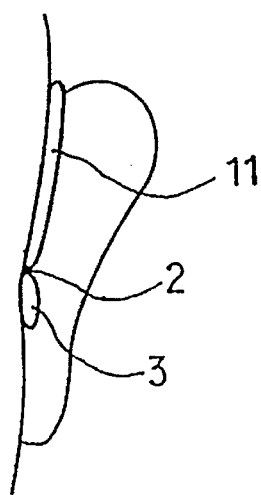
FIG. 2 is a rear elevation illustrating that the eyeglass frame of the present invention is in use.

An inclined portion 11 of an eyeglass frame temple 1 to be securely supported on the behind-the-ear region (i.e., the temporal region from an O point or its neighborhood to the end of an end cover as shown in the drawings) is slightly shorter than the standard length of the inclined portion of the conventional type. In other words, the inclined portion 11 extends to terminate at around the boundary between the fore and rear half regions a and b of the concave potion in the behind-the-ear region and is shaped to substantially fit along the curvature of the behind-the-ear region. The eyeglass frame temple 1 may be a metal temple having a main portion made of a metal and an end cover to be kept in contact with the behind-the-ear region. The temple may be a plastic temple.

The end of the inclined portion 11 has a ball tip 3 attached thereto by a wire or plate spring 2. The spring 2 is highly resilient, and the ball tip 3 is attached such that it is so located as to achieve contact with the rear half region b of the concave portion of the behind-the-ear region when in use.

As the spring 2, one (FIGS. 3 and 4) or a plurality of wire or plate springs (FIG. 5) are used. Two wire or plate springs are sufficient in the case of using a plurality of springs. The plurality of wire or plate springs 2 are arranged in parallel.

Figure 3:
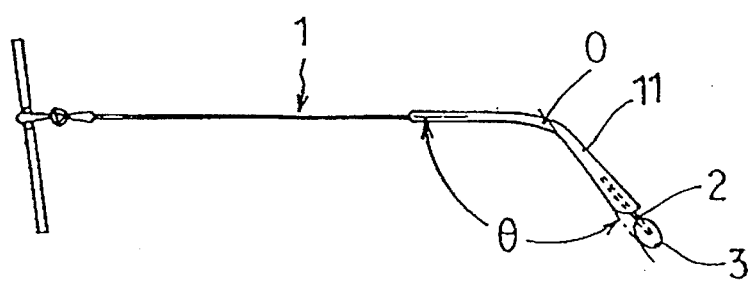
FIG. 3 is a side elevation of the eyeglass frame of FIG. 1.
Figure 4:
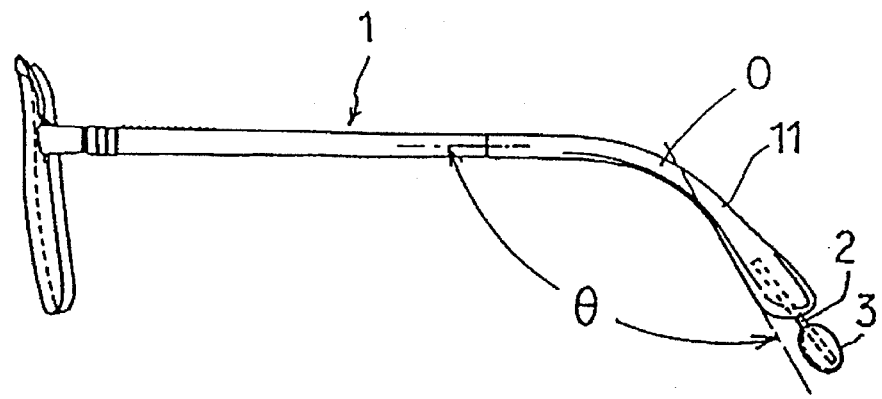
FIG. 4 is a side elevation illustrating another embodiment of the present invention.

The eyeglass frame may be of an extremely slim and lightweight type as shown in FIGS. 1 and 3, or of the standard type as shown in FIG. 4.

The bending angle θ of the inclined portion 11 is not specifically limited to since the position of the curvature of the behind-the-ear region for secure support of the inclined portion 11 differs from person to person, but the preferred angle is generally about 120°. This angle is adjusted to locate the ball tip 3 at a position where it can be brought into contact with the rear half region b of the concave portion of the behind-the-ear region although the inclined portion has a predetermined length slightly shorter than the standard length of an inclined portion of the conventional type. Moreover, the ball tip 3 can be positioned so as to enable adaptation of the frame to the use by more people.

Generally, the preferred distance between the ball tip 3 and the end of the inclined portion 11 is about 2–3 mm.

The spring force of the wire or plate spring 2 may widely vary in flexibility depending on the rigidity of the eyeglass frame temple 1. Generally, for example, when the eyeglass frame temple has the highest spring rigidity, a suitable flexibility of the spring 2 may be equivalent to that of a stainless steel wire of about 0.8 mm in diameter used for a member referred to as "brace bar" in the eyeglass industry (a kind of a decorative member extending between right and left rims and located above the bridge). On the other hand, when the eyeglass frame temple has the lowest rigidity, the flexibility of the spring 2 may be equivalent to that of a stainless steel wire of about 0.54 mm in diameter.

When the spring rigidity of the eyeglass frame temple is between the above "highest" and "lowest", the flexibility of the spring 2 may be predetermined based on the above "highest" or the "lowest" rigidities.

Though the curvature of the behind-the-ear region, on which the inclined portion of an eyeglass frame temple is to be held, varies from person to person, the inclined portion of the present invention is formed to have a shape which substantially matches the curvature of the behind-the-ear region.

Therefore, in order to achieve a good fitting of the inclined portion over the behind-the-ear region by this construction, it is necessary to compensate for the deficiency in the fitness of the inclined portion over the curvature of the behind-the-ear region.

According to the present invention, the inclined portion has the given shape and a predetermined length as mentioned above, and the ball tip is positioned at a predetermined location and attached by the wire or plate spring 2 having high reliance.

This construction compensates for the deficiency in the fitness. That is, the inclined portion has a predetermined length so that the inclined portion can be held almost firmly at the fore half region a of the concave portion of the behind-the-ear region, and the ball tip lightly presses the rear half region b of the concave portion in a manner which well matches the rear half region b, whereby the deficiency in the fitness of the inclined portion is compensated for to achieve a good fitting of eyeglasses.

As stated above, according to the present invention, an inclined portion has a shape contoured substantially in conformity with the curvature of the behind-the-ear region of a wearer, and the inclined portion can be fitted as contemplated in a simple and precise manner.

In the case of using a plurality of parallel wire or plate springs to attach the ball tip to the end of the eyeglass frame temple, the ball tip can be pressed more stably than in the case of using a single spring, whereby the deficiency in the fitness of the inclined portion is made up for more effectively.

Further, the use of the plurality of parallel wire or plate springs has the following advantage.

When a single wire or plate spring is used, and the eyeglass frame temple is made of a metal, the bore, through which a core 10 of the end cover extends, aligns with the bore through which the spring extends. This means that the reinforcement effect for the end cover by the core 10 is reduced at the place where the fore end of the core 10 adjoins the rear end of the spring. Especially, the situation is worse for the following case.

The length from the front frame to O point of a skull temple affects the fitness of the eyeglasses. A method for adjusting the eyeglass frame temple length is to change the position of the end cover. To lengthen the eyeglass frame temple, the end cover is shifted toward its rear end relative to the core 10. Then, a space is created in the end cover between the fore end of the core 10 and the rear end of the spring to thereby reduce the strength of the end cover.

Figure 5:
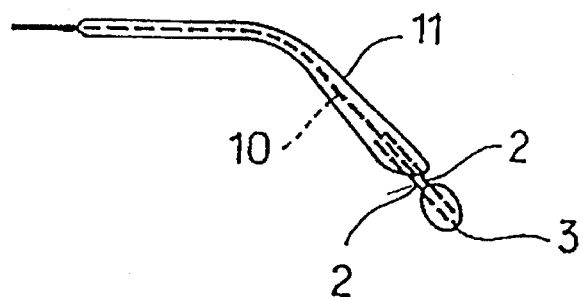
FIG. 5 is a side elevation illustrating a variant of a wire spring or plate spring for attaching a ball tip of the present invention.
Figure 6:
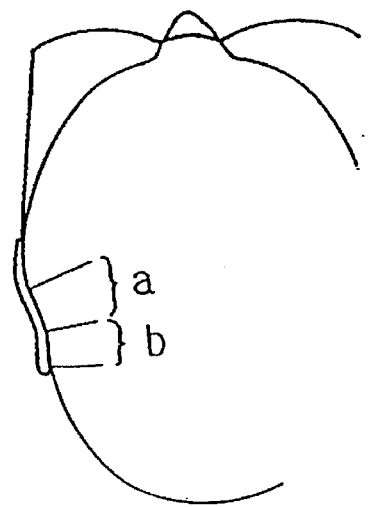
FIG. 6 is a plan view schematically showing a curvature of the behind-the-ear region on which an inclined portion of the frame temple is securely supported.

By contrast, in the case of using a plurality of parallel wire or plate springs, the plurality of springs can be embedded into the end cover in such a manner as to extend along both sides of the core 10 as shown in FIG. 5, so that the decreased strength of the end cover due to the space formed can be compensated for by shifting the end cover as described above to lengthen the eyeglass frame temple.

According to the present invention, it is also possible to injection-mold an end cover or a plastic temple together with a ball tip.

As stated above, according to the present invention, the inclined portion of an eyeglass frame temple can be fitted on the behind-the-ear region accurately and readily.

What is claimed is:

1. A temple for an eyeglass frame, the temple comprising (a) a downwardly inclined temple end portion which is securely supportable behind-the-ear region at the side head of one who wears the eyeglass frame, and (b) a ball tip attached to the rear end of the inclined temple end portion by a spring, the inclined temple end portion terminating at substantially the bottom of a concave portion in a curvature of the behind-the-ear region, the inclined temple end portion being shaped to substantially fit along the curvature of the behind-the-ear region, the spring extending in the direction of inclination of the inclined temple end portion, the spring being a wire or plate spring having high resilience, and the ball tip being in a position wherein the ball tip contacts the wearer's side head at a rear half region of a concave portion in the curvature of the behind-the-ear region.

2. A temple for an eyeglass frame, the temple comprising (a) a downwardly inclined temple end portion which is securely supportable behind-the-ear region at the side head of one who wears the eyeglass frame, and (b) a ball tip attached to the rear end of the inclined temple end portion by a plurality of springs arranged in parallel, the inclined temple end portion terminating at substantially the bottom of a concave portion in a curvature of the behind-the-ear region, the inclined temple end portion being shaped to substantially fit along the curvature of the behind-the-ear region, the plurality of springs arranged in parallel extending in the direction of inclination of the inclined temple end portion, the springs being wire or plate springs having high resilience, and the ball tip being in a position wherein the ball tip contacts the wearer's side head at a rear half region of a concave portion in the curvature of the behind-the-ear region.

\* \* \* \* \*